(12) United States Patent
Gerhardt et al.

(10) Patent No.: US 11,691,379 B2
(45) Date of Patent: Jul. 4, 2023

(54) FIRE-RESISTANT TEXTILE COMPOSITE

(71) Applicant: Milliken & Company, Spartanburg, SC (US)

(72) Inventors: Warren W. Gerhardt, Spartanburg, SC (US); Robert D. Miller, Piedmont, SC (US); Timothy W. Godfrey, Spartanburg, SC (US); Ryan Darnell, Greer, SC (US); Emily W. Michaels, Taylors, SC (US)

(73) Assignee: Milliken & Company, Spartanburg, SC (US)

( * ) Notice: Subject to any disclaimer, the term of this patent is extended or adjusted under 35 U.S.C. 154(b) by 22 days.

(21) Appl. No.: 16/897,428

(22) Filed: Jun. 10, 2020

(65) Prior Publication Data

US 2020/0398523 A1      Dec. 24, 2020

Related U.S. Application Data

(60) Provisional application No. 62/864,178, filed on Jun. 20, 2019.

(51) Int. Cl.
*B32B 5/02*      (2006.01)
*B32B 5/06*      (2006.01)
(Continued)

(52) U.S. Cl.
CPC ............... *B32B 5/26* (2013.01); *B32B 5/022* (2013.01); *B32B 5/026* (2013.01); *B32B 5/06* (2013.01);
(Continued)

(58) Field of Classification Search
None
See application file for complete search history.

(56) References Cited

U.S. PATENT DOCUMENTS 4,743,495 A * 5/1988 Lilani ...................... B32B 5/06
                                                                  442/388
4,750,443 A * 6/1988 Blaustein .................. B32B 5/26
                                                                  428/920
(Continued)

FOREIGN PATENT DOCUMENTS

DE       4025813 A  *  2/1992   ......... A41D 31/0027
DE       10107054        8/2002
(Continued)

OTHER PUBLICATIONS

Machine Translation of JP-07013344-B2, May 1995 (Year: 1995).*
(Continued)

*Primary Examiner* — Jeffrey A Vonch
(74) *Attorney, Agent, or Firm* — Cheryl J. Brickey (57) ABSTRACT

The application relates to a fire-resistant textile composite having an upper surface and a lower surface. The composite contains a nonwoven layer and a knit layer. The nonwoven layer has a first and second side and contains a nonwoven textile. The nonwoven textile contains a plurality of first fire-resistant fibers, where the first fire-resistant fibers are non-thermoplastic. The nonwoven layer forms the lower surface of the textile composite. The knit layer contains a knit textile having a first and second side and the second side of the knit layer is adjacent to the first side of the nonwoven layer. The knit textile contains a plurality of second fire-resistant yarns, where the second fire-resistant yarns are non-thermoplastic. At least a portion of the first fire-resistant fibers from the nonwoven layer extend through the first side of the knit layer and form the upper surface of the textile composite.

6 Claims, 3 Drawing Sheets

(51) Int. Cl.
| | |
|---|---|
| *B32B 5/08* | (2006.01) |
| *B32B 5/10* | (2006.01) |
| *B32B 5/14* | (2006.01) |
| *B32B 5/26* | (2006.01) |
| *D04B 1/16* | (2006.01) |
| *D04H 3/005* | (2012.01) |
| *D04H 13/00* | (2006.01) |
| *D02G 3/44* | (2006.01) |
| *D04H 1/43* | (2012.01) |
| *D04H 1/46* | (2012.01) |
| *B64D 11/06* | (2006.01) |
| *D04B 1/10* | (2006.01) |
| *D04B 1/22* | (2006.01) |

(52) U.S. Cl.
CPC ............... *B32B 5/08* (2013.01); *B32B 5/279* (2021.05); *D02G 3/443* (2013.01); *D04B 1/16* (2013.01); *D04H 1/43* (2013.01); *D04H 1/46* (2013.01); *D04H 3/005* (2013.01); *D04H 13/00* (2013.01); *B32B 2260/021* (2013.01); *B32B 2262/0246* (2013.01); *B32B 2262/0269* (2013.01); *B32B 2262/062* (2013.01); *B32B 2307/3065* (2013.01); *B32B 2307/51* (2013.01); *B32B 2307/554* (2013.01); *B32B 2307/718* (2013.01); *B32B 2571/00* (2013.01); *B32B 2605/18* (2013.01); *B64D 11/06* (2013.01); *D04B 1/102* (2013.01); *D04B 1/22* (2013.01); *D10B 2201/02* (2013.01); *D10B 2321/10* (2013.01); *D10B 2331/02* (2013.01); *D10B 2331/021* (2013.01); *D10B 2505/08* (2013.01); *Y10T 428/24339* (2015.01)

(56) References Cited

U.S. PATENT DOCUMENTS

| | | | | |
|---|---|---|---|---|
| 5,149,582 | A * | 9/1992 | LaMarca, II | B32B 27/12 428/920 |
| 5,770,530 | A | 6/1998 | Nockemann | |
| 7,709,405 | B2 | 5/2010 | Wenstrup | |
| 8,298,969 | B2 | 10/2012 | Bahukudumbi | |
| 2002/0182967 | A1 * | 12/2002 | Erb, Jr. | B32B 5/022 442/415 |
| 2003/0232560 | A1 * | 12/2003 | Corner | B32B 5/26 428/920 |
| 2004/0060119 | A1 * | 4/2004 | Murphy | A47C 31/001 5/698 |
| 2004/0117958 | A1 * | 6/2004 | Turkson | B32B 5/26 28/107 |
| 2004/0157521 | A1 * | 8/2004 | Montini | D04H 1/4342 442/320 |
| 2004/0198125 | A1 * | 10/2004 | Mater | D04H 1/43828 442/394 |
| 2005/0208855 | A1 * | 9/2005 | Zhu | D02G 3/047 442/302 |
| 2005/0215142 | A1 * | 9/2005 | Bascom | B32B 5/06 442/352 |
| 2006/0035555 | A1 * | 2/2006 | Narayanan | D04H 1/48 428/920 |
| 2006/0105658 | A1 * | 5/2006 | Patz | D03D 15/513 442/181 |
| 2006/0160451 | A1 * | 7/2006 | Dry | D04B 21/16 66/195 |
| 2006/0228968 | A1 * | 10/2006 | Ogle | B32B 5/08 442/381 |
| 2006/0264136 | A1 * | 11/2006 | Chiantese | A41D 31/265 428/920 |
| 2007/0066175 | A1 * | 3/2007 | Wolf | B32B 5/08 428/920 |
| 2007/0207691 | A1 * | 9/2007 | Cobbett Wiles | B60N 2/58 442/318 |
| 2007/0249250 | A1 * | 10/2007 | Servajean | A41D 31/08 442/184 |
| 2009/0186193 | A1 * | 7/2009 | Yoshida | B32B 5/06 28/104 |
| 2011/0207379 | A1 * | 8/2011 | Henkes | B60N 2/58 442/36 |
| 2011/0275267 | A1 * | 11/2011 | Smith | D04H 1/40 442/301 |
| 2013/0117940 | A1 * | 5/2013 | Jones | B32B 5/26 5/698 |
| 2013/0198941 | A1 * | 8/2013 | John | B32B 27/08 2/455 |
| 2014/0196201 | A1 * | 7/2014 | Deng | D06P 3/8204 2/455 |
| 2014/0208491 | A1 * | 7/2014 | Schmitt | A41D 31/08 57/208 |
| 2015/0218747 | A1 * | 8/2015 | Oschatsz | D06P 3/60 442/141 |
| 2016/0237599 | A1 * | 8/2016 | Sanchez | D03D 15/513 |
| 2017/0101729 | A1 * | 4/2017 | Rhee | D04H 1/4342 |
| 2021/0001596 | A1 * | 1/2021 | Harada | B32B 5/022 |
| 2021/0114332 | A1 * | 4/2021 | Hessenberger | B32B 5/024 |

FOREIGN PATENT DOCUMENTS

| | | | | |
|---|---|---|---|---|
| DE | 202011051148 U1 * | 11/2011 | | B32B 5/24 |
| DE | 102017205284 | 10/2018 | | |
| EP | 190064 A * | 8/1986 | | A47C 31/001 |
| FR | 2592334 A * | 7/1987 | | A47C 31/001 |
| FR | 2917100 A1 * | 12/2008 | | D04B 21/165 |
| GB | 2246097 A * | 1/1992 | | A47C 7/26 |
| GB | 2327379 A * | 1/1999 | | A47C 7/26 |
| JP | 03082858 A * | 4/1991 | | A47C 31/001 |
| JP | 04091266 A * | 3/1992 | | |
| JP | 07013344 B2 * | 5/1995 | | |
| JP | 09123317 A * | 5/1997 | | |
| JP | 2000211051 A * | 8/2000 | | |
| JP | 2002054067 A * | 2/2002 | | |
| JP | 2012062608 A * | 3/2012 | | |
| KR | 1304253 B1 * | 9/2013 | | |
| WO | WO-2014015351 A1 * | 1/2014 | | A41D 31/06 |

OTHER PUBLICATIONS

Machine Translation of DE-202011051148-U1, Nov. 2011 (Year: 2011).*
Machine Translation of JP-04091266-A, Mar. 1992 (Year: 1992).*
Machine Translation of JP-2000211051-A, Aug. 2000 (Year: 2000).*
PCT/US2020/037164 International Search Report, 6 pages.
PCT/US2020/037164 International Written Opinion, 9 pages.
International Preliminary Report on Patentability for App. No. PCT/US2020/037164, dated Dec. 21, 2021, 8 pages.

* cited by examiner

FIRE-RESISTANT TEXTILE COMPOSITE

RELATED APPLICATIONS

This application claims priority to U.S. Provisional Patent Application 62/864,178, filed on Jun. 20, 2019, which is herein incorporated by reference in its entirety.

FIELD OF THE INVENTION

The present invention generally relates to fire-resistant textile composites.

BACKGROUND

Regulations for aviation and space are covered under Title 14 of the U.S. Code of Federal Regulations. Federal Aviation Regulations (FAR) in regard to the flammability of aircraft seating are found in FAR Part 25.853 as well as Appendix F of Part 25. Aircraft seats often have a polyurethane (PU) foam cushion. This cushion provides comfort but is also quite flammable. The FAR flammability test is colloquially referred to as the "Oil Burn Test". To pass this Oil Burn Test it is often necessary to place a fire barrier textile between the foam cushion and the outer dress cover. This fire barrier must also survive the harsh physical testing that is meant to mimic the service life of an aircraft seat over ten or more years of service life. The benchmark fire barrier product has a second textile attached to the face that provides the requisite abrasion resistance.

Overall, this protective fire barrier has a critical role, but its presence also detracts from the comfort and aesthetics of the final seat assembly. A preferred fire barrier textile would pass all the requisite FR and physical testing, while being lightweight, imperceptible, inexpensive, and minimally disruptive to the final form and comfort of the seat.

BRIEF SUMMARY

The application relates to a fire-resistant textile configured as a bi-layer composite having an upper surface and a lower surface. The composite contains a nonwoven layer and a knit layer. The nonwoven layer has a first and second side and contains a nonwoven textile. The nonwoven textile contains a plurality of first fire-resistant fibers, where the first fire-resistant fibers are non-thermoplastic. The nonwoven layer forms the lower surface of the textile composite. The knit layer contains a knit textile having a first and second side and the second side of the knit layer is adjacent to the first side of the nonwoven layer. The knit textile contains a plurality of first fire-resistant yarns, where the first fire-resistant yarns are non-thermoplastic. At least a portion of the first fire-resistant fibers from the nonwoven layer extend through the first side of the knit layer and form the upper surface of the textile composite.

DETAILED DESCRIPTION

Figure 1:
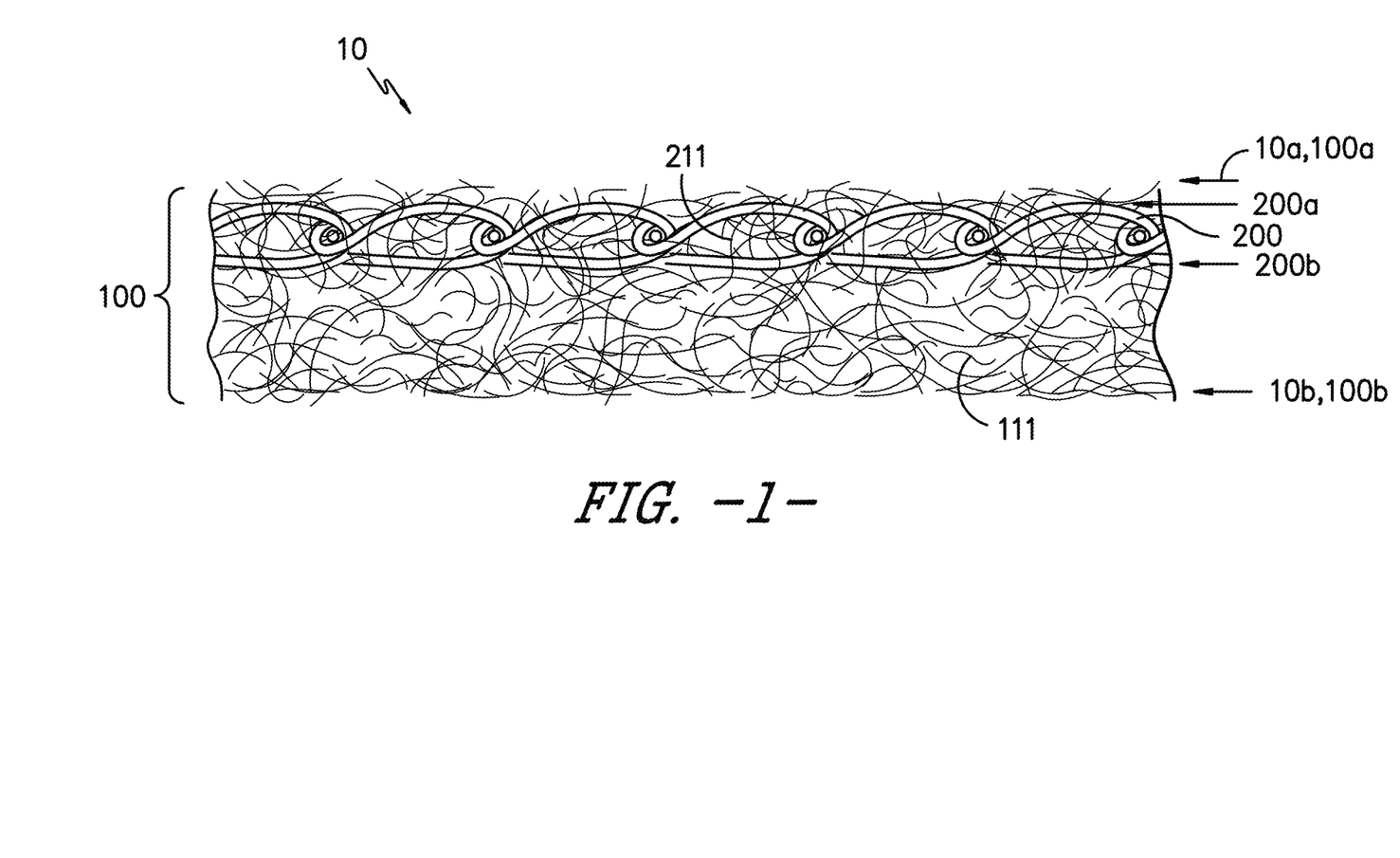
FIG. 1 illustrates a cross-section of one embodiment of the fire-resistant textile composite.

Referring to FIG. 1, there is shown one embodiment of the present invention, the fire-resistant textile composite 10. The fire-resistant textile composite 10 has a first side 10a and a second side 10b. How the first 10a and second 10b sides of the composite 10 are oriented relative to other materials or layers depends on the end use for the composite. In one embodiment, the composite 10 is used in an airplane seat between the cushion (typically polyurethane) and the outer fabric (that the user sees and interacts with). In this embodiment, it is preferred in many embodiments that the composite is oriented such that the first side 10a faces the outer fabric.

The fire-resistant textile composite 10 contains a nonwoven layer 100 and a knit layer 200. The nonwoven layer 100 has a first side 100a and a second side 100b and contains a nonwoven textile.

In one embodiment, the total composite has a weight of about 120 to 300 grams per square meter (GSM), preferably between about 130 to 250 GSM. In one embodiment, the nonwoven layer has a weight of about 100 to 200 GSM. In another embodiment, the knit layer has a weight of about 25 to 125 GSM. In another embodiment, the knit layer has a weight of about less than about 75 GSM.

In one embodiment, the nonwoven layer is between about 30 and 80% by weight, more preferably between about 40 and 80% by weight of the composite. In one embodiment, the knit layer is between about 20 and 70% by weight, more preferably between about 20 and 60% by weight of the composite.

The nonwoven textile can contain any suitable fibers. In a preferred embodiment, the nonwoven textile contains a plurality of first fire-resistant fibers 11. Preferably, the first fire-resistant fibers are non-thermoplastic. The first fire-resistant fibers preferably are thermoset polymers or fibers/materials that do not have a melting temperature (such as cotton).

The first fire-resistant fibers may be any suitable fiber. This includes, but is not limited to mineral fibers such as silica and basalt, aramids, carbon fibers including partially oxidized polyacrylonitrile (OPAN) and fully carbonized carbon, rayon both inherently FR including with modified cores and chemically treated FR rayon, natural fibers such as wool, para-aramid, polybenzimidazole (PBI), polybenzoxazole (PBO), polyoxadiazole (POD), Novoloid (phenolic fiber), Polysulfonamide (PSA), polyacrylate, siliceous fibers, melamine fibers, chemically treated synthetic fibers, blended in any ratio. In one preferred embodiment, the fire-resistant fibers comprise partially oxidized polyacrylonitrile (PANOX®). In another embodiment, the first fire-resistant fibers comprise polyacrylate.

The nonwoven textile may also contain additional fibers including third fire-resistant fibers. These third fire-resistant fibers may be the same materials as the first fire-resistant fibers but possibly with a different denier, staple length, finish, coatings, etc or may be a different type of fire-resistant fiber.

The second side 100b of the nonwoven layer 100 forms the lower surface 10b of the textile composite 10.

The knit layer 200 contains a knit textile having a first side 200a and second side 200b and the knit layer 200 is at least partially embedded into the nonwoven layer 100. The knit layer 200 is oriented such that the first side 200a of the knit layer faces the upper surface 10a of the fire-resistant textile. The knit textile can be any suitable knit structure, preferably a structure having stretch in both the machine and cross-machine directions. By having stretch, it is meant that the fabric elongates under conditions of a human stretching it with their hands and that the fabric returns to approximately the original shape once the stretching force is removed. This enables the resultant composite 10 to have a degree of flexibility and stretch to make it easier for the composite to conform to those layers below it.

Figure 2:
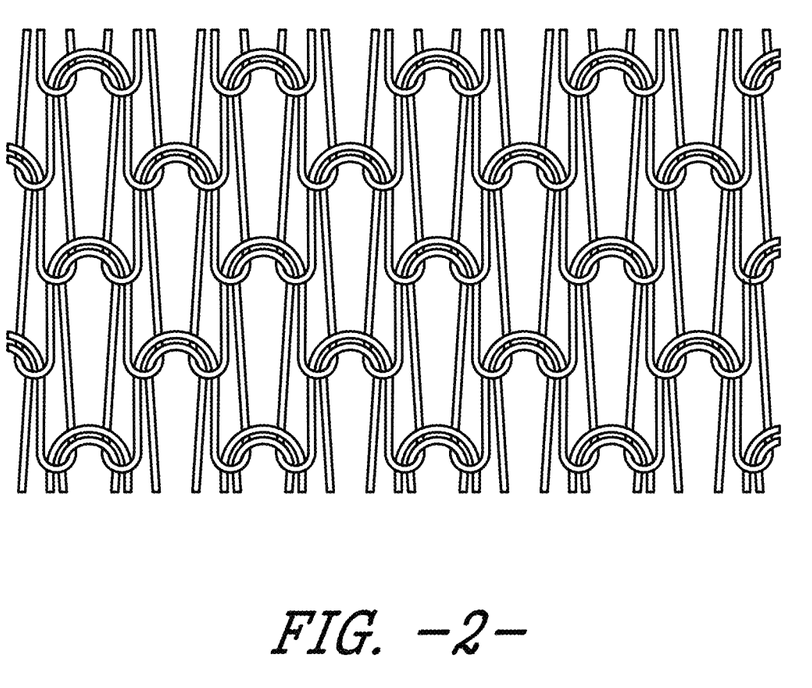
FIG. 2 shows an illustration of a lacoste knit pattern.

In one embodiment, the knit textile is a circular knit. Once the knit is formed as a tube, it is sliced open to provide a flat textile layer. In another embodiment, the knit is a lacoste knit such as shown in FIG. 2. It has been found that the lacoste knit has a knit pattern that provides the stretch in both directions as well as other preferred characteristics.

The knit textile contains a plurality of second fire-resistant yarns, where the second fire-resistant yarns 211 are non-thermoplastic. The second fire-resistant yarns 211 may be any suitable fire-resistant yarn and the yarns may contain any suitable fire-resistant fibers, such as those fibers listed as options for the first fire-resistant fibers 111. Preferably, the knit textile contains spun yarns with flame resistant fibers such as: para-aramid, meta-aramid, polybenzimidazole (PBI), polybenzoxazole (PBO), polyoxadiazole (POD), polyphenylene sulfide (PPS), Novoloid (phenolic fiber), Polysulfonamide (PSA), and polyacrylate (PYROTEX™ fiber). Alternatively, a blend of these fibers with an FR cellulosic fiber will give a lower cost but similarly robust textile.

In one preferred embodiment, the second fire-resistant yarns comprise aramid. In another embodiment, the second fire-resistant yarns comprise para-aramid.

The knit textile may also contain additional yarns including fourth fire-resistant yarns. These fourth fire-resistant yarns may be the same materials as the second fire-resistant yarns but with different denier, number of filaments, coatings, etc. or may be a different type of fire-resistant yarn. In one embodiment, the fourth fire-resistant yarns comprise fire-resistant cotton. In another embodiment, the second fire-resistant yarns 211 may contain more than one type of fire-resistant fiber such as a blend of para-aramid and fire-resistant cotton.

The yarns in the knit textile were designed to maximize the abrasive resistance of the final bi-layer composite and minimize the mass contribution of the knit textile to the total mass. A majority of the yarns, in both knit textiles discussed in the examples, are comprised of an abrasion resistant fiber. In one embodiment, this abrasion resistant fiber is a para-aramid. In one embodiment, this abrasion resistant fiber is spun as a fine cotton count yarn. This combination of a thermally stable and abrasion resistant fiber constructed in a very fine yarn, provides the desired balance of final properties with minimal contribution to the total mass. In one embodiment, the yarn is a 40-singles cotton count. In another embodiment, the yarn is a 50-singles cotton count. In one embodiment, the nonwoven contains essentially 100% panox. In another embodiment, the knit contains essentially 100% POD yarn (essentially 100% means that at least 98% by weight of the yarns/fibers are the specified material leaving a small percentage for contamination fibers/yarns).

After needling the nonwoven and knit components together in a bi-layer composite, at least a portion of the first fire-resistant fibers from the nonwoven layer extend through the first side of the knit layer. This process gives an upper surface of the textile composite comprised of both the structured knit yarns as well as the insulative nonwoven fibers. A portion of the nonwoven layer fibers extending through the knit layer is a result of the needling of the two layers together. This would not typically be the location of the fibers if the two layers were glued or thermally adhered together using an adhesive or low melt fibers. In one embodiment, the fibers from the nonwoven layer extend at least about the thickness of the knit layer past the first side of the knit layer. In another embodiment, the fibers from the nonwoven layer extend at least about 1 mm, more preferably at least about 2 mm past the first side of the knit layer. In another embodiment, the fibers from the nonwoven layer extend at least about 4 mm past the first side of the knit layer. The role of the flame-resistant nonwoven is to provide a stable insulative barrier that does not change significantly during a thermal event, in regard to dimensions and air permeability. The upper knit layer provides an increased integrity and abrasion resistance to the final assembly while at the same time maintaining a modest level of stretch and conformability. The coupling of the two layers is achieved through a needling process. This needling serves various purposes:

The needling is necessary to give a good mechanical fastening of the knit layer to the nonwoven substrate. The needling is necessary to embed the knit layer at a sufficient depth into the nonwoven substrate so that the bi-layered textile composite behaves as a single monolithic material during stretching and manipulations, during both testing and throughout its service life. If the stretching of the two layers in the final assembly are incommensurate, then a separation and subsequent failure will occur. This would most likely be observed during abrasion testing. However, this depth needs to be balanced with the need to have the knitted textile closer to the surface, so that it may serve as an abrasive wear layer during physical testing and during the service life of the final article.

Finally, over-needling the two components will lead to a thickness reduction and concomitant reduction in the insulative performance of the final article. This reduced performance would be best observed during flammability testing.

The knit layer is typically stretchier than the nonwoven layer. The amount of needling required is to enough to fully join the two layers together (so that they do not separate into two distinct and separate layers during formation of the textile composite, formation of the textile composite into a flame-retardant seat, or in use in a seat). The stretchiness of the composite is below that of the knit layer but above that of the nonwoven layer.

The nonwoven layer 100 may be formed by any suitable method including, but not limited to carding or garneting, air laying, cross-lapping, needling, structuring, stitching, and bonding. The nonwoven layer 100 contains a plurality of primary fibers as well as optional fibers such as binder fibers and other effect fibers.

Preferably, the nonwoven layer 100 is formed by carding, cross-lapping, and needle-punching, and optionally thermal bonding a plurality of primary fibers and optional binder fibers. After the nonwoven layer 100 and the knit layer 200 are formed, they are combined preferably by a needling process. The needling process forces some of the fibers from the nonwoven layer 100 through the knit layer 200 and out from the first side 200*a* of the knit layer 200 to form the upper surface of the composite 10*a*.

Example 1

A nonwoven fabric, which is comprised of para-aramid and OPAN staple fibers in a ratio of 64%/36%, was blended, carded, and needled to give an areal mass of approximately 160 GSM. A scrim, which was comprised of a 100% meta-aramid 30/2 cotton count yarn in a plain weave construction of 22 ends/inch and 14 picks/inch construction and having an areal density of 50 GSM was needled to one face of this nonwoven substrate. The final bi-layered textile composite had an areal density of approximately 210 GSM and a thickness of 1.5-2.0 mm. This example is commercially available.

Example 2

Figure 3:
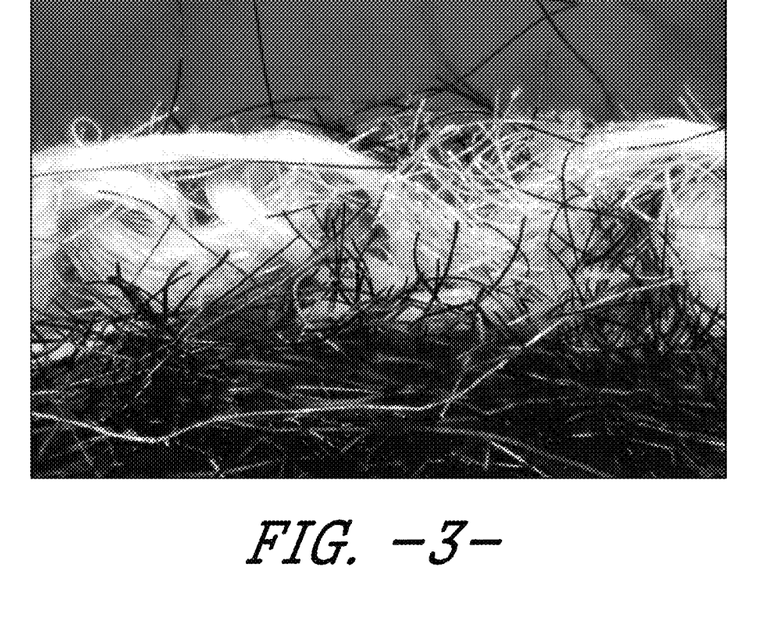
FIG. 3 shows a cross-sectional micrograph of the fire-resistant textile composite of Example 2 at 100× magnification.
Figure 4:
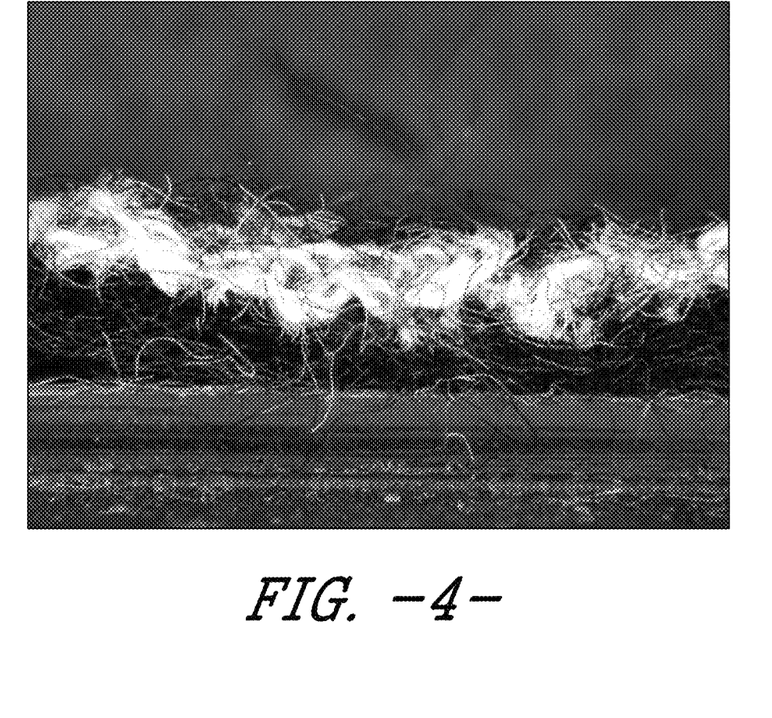
FIG. 4 shows a cross-sectional micrograph of the fire-resistant textile composite of Example 2 at 30× magnification.

A nonwoven fabric, which is comprised of OPAN and Pyrotex polyacrylate staple fibers in a ratio of 70%/30%, was blended, carded, and needled to give an areal mass of approximately 145 GSM. A Lacoste knit textile, knitted from a 100% para-aramid 50-singles cotton count yarn, and having an areal mass of approximately 65 GSM was needled to one face of the nonwoven textile substrate. The final bi-layered textile composite had an areal density of approximately 210 GSM and a thickness of 1.5-2.0 mm. FIG. 3 shows a cross-sectional micrograph of the fire-resistant textile composite of Example 2 at 100× magnification and FIG. 4 shows a cross-sectional micrograph of the fire-resistant textile composite of Example 2 at 30× magnification. One can see in the cross-sectional micrographs of FIGS. 3 and 4 that the fibers from the nonwoven extend through and past the surface of the knit.

Example 3

A Lacoste knit that was prepared using two feed yarns, A and B: A para-aramid 50-singles yarn is the A-yarn, and a 50-singles pima cotton yarn is the B-yarn. The feed ratio was 62% A-yarn and 38% cotton-yarn. In the case of Example 3, the final knit is referred to as a mechanical blend, with the minor B-yarn (cotton) biased towards the obverse face. This final knit had an areal density of approximately 70 GSM. This knit fabric was then treated with an FR treatment composition that was 22 parts by weight of ammonium polyphosphate and 78 parts by weight water. The treatment composition was padded onto the knitted textile substrate at a wet pickup of approximately 70% by weight. The treated textile substrate was then dried for approximately 3 minutes in a convection oven under tension at a temperature of approximately 149° C. (300° F.). The percentage phosphorus by mass of the treated knit was approximately 0.5%-1%. The final areal density of the treated knit was approximately 65 GSM. This reduced density, even after adding additional mass from the FR treatment, was due to the knit being dried under tension at a final width slightly wider than its starting width. This knitted textile, with an FR treatment, was needled to one face of the same nonwoven textile substrate described in Example 2 (a blend of 70:30 PANOX™: PYROTEX™) to give a bi-layered textile composite with an areal density of approximately 210 GSM and a thickness of 1.5-2.0 mm.

Lab Scale Burn Test

A lab scale test designed to be a small-scale version of the "Oil Burn Test" was used to compare the relative performance of each FR barrier. The test was performed in a hood, with a pressure of 1.245 millibar. A methane fed Bunsen burner with an eight-inch flame was positioned two inches below a horizontally mounted iron ring with an inner diameter of 4 inches. This ring provided a stable base for an approximately 8×8 inch×2-inch-thick PU foam bun with an approximate mass of 50 g. This PU foam bun was previously wrapped in a layer of the FR barrier material that is to be tested. At least one face of the PU foam bun is fully covered in the FR barrier, held in place with pins, and then placed on the ring stand with the barrier facedown exposing it to the test flame. The sample is exposed to the test flame for two minutes, and allowed to cool for 5 min. Assuming the PU foam does not continue burning after the allotted two minutes (an automatic test failure), then a characteristic crater with the same diameter as that of the iron ring's inner diameter, but of variable depth, is burned into the PU foam bun. Upon cooling, the depth of this crater and the mass loss of the foam are both measured and recorded. The mass loss of the foam is then normalized, assuming a 50 g slab of the PU foam, to correct for batch to batch variations in the mass of the PU foam bun. Ultimately, these final test results are only relative. This relativity is due to subtle variations in the flame height from day-to-day, which may be due to human error, inconsistent air-flow, temperature fluctuations, or any other external condition. This minor, but critical, flame height variation requires that the test be calibrated every time the flame is turned on. Calibration is done by first recording the test performance of a commercially available, and thus highly regular, FR barrier material. All subsequent prototypes are given a passing/failing grade based on their normalized foam mass loss vs the calibrated commercial fire barrier, on that specific day. A typical foam mass loss result is in the range of 1.5-3 weight percent. A crater depth of 0.5-1 inch is typically observed.

After burning, the surface of the commercially available Example 1 was damaged and had broken in some areas. Upon flexing the charred scrim would crack and open up even further. However, the scrims of both bi-layered textile composites from Example 2 and Example 3, while heavily charred, remained intact and were still flexible and functional after burning. This desirable benefit is due to the high content of the thermally stable para-aramid in both knitted textiles.

Abrasion Results of Example 1 vs Example 2

The bi-layer textile composites Examples 2 had abrasion resistance similar to the commercially available Example 1. Abrasion results of the Martindale BS 5960: 1988 test had both scrim components resisting 10,000-12,000 cycles with the standard abradant and the entire composites surviving out beyond 30,000 cycles. This commensurate performance is believed to be the result of: the para-aramid yarn in the knit textile, the stretch characteristics constructed into the knit textile, and the increased surface area coverage of the knit textile yarns as compared to the woven textile scrim. All of these benefits are discussed below.

1) The para-aramid fibers are known to be highly abrasion resistant.

2) The stretch-recovery properties of the knit permit this top layer to elastically deform and resist the repeated insults of the abradant.

3) The high surface area coverage of the smaller yarns in the knit textile permits more of the yarn fibers to engage with the abradant, surface to surface.

Stretch Results of Example 1 vs Example 2

The bi-layered textile composites from Example 2 had a modest amount of residual stretch. This residual stretch was retained from the knit textile, which could easily stretch (too low a load force for the Instron to measure) to over 50% with full recovery upon relaxation. The retained stretch of the bi-layer composite from Example 2 was approximately 8% when a load force of only 0.5 lbs was applied. Upon relaxation this composite material had almost 100% stretch recovery. This stretch feature provides a desirable level of conformability, which the commercially available Example 1 was lacking after ASTM D 6614. Example 1 stretched only 6%, and this required 35 lbs of loading force. Upon relaxation, it had only 33% recovery of its original dimensions, leaving the material permanently distorted and damaged.

Knit Surface Analysis

Magnified image analyses of each scrim surface of each example were performed on a Kyence Digital Microscope. The scrim surface was colored white and the rest of the pixels in the digital image were inverted to black. The pixel area of each color was then measured to give a percent coverage of scrim over the outer surface of each nonwoven.

The commercially available Example 1, which has a woven scrim, gave a surface area coverage of approximately 45%. The bi-layered textile composite from Example 2, which has a 100% para-aramid knit textile, gave a surface area coverage of approximately 70%. The bi-layered textile composite from Example 3, which has a 62%/38% para-aramid/FR cotton mechanically blended knit textile, gave a surface area coverage of approximately 55%. The difference in the surface area coverage of the knit textiles from Example 2 compared to Example 3 was due to stretching and setting of the knit during the FR treatment. This is an additional processing step done under tension, which opened the knit structure of the scrim from Example 3.

The level of entanglement and depth of penetration of each scrim into their respective nonwoven substrates was made readily observable through this same imaging analysis. The knitted scrim is a plated textile with two distinct faces. In the case of Example 2 these faces are symmetrical since the A and B yarns are identical, a 100% para-aramid spun yarn. In the case of Example 3 these faces are asymmetrical. The A yarn is a 100% Para-aramid spun yarn and the B yarn is a 100% cotton spun yarn has more of a 3-D structure. The feed ratio of the A and B yarns in the knit used in Example 3 is 62% A:38% B, this process gives a mechanically blended fabric that can be biased.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A fire-resistant textile composite having an upper surface and a lower surface, wherein the fire-resistant composite has a weight of about 120 to 200 g/m$^2$, wherein the composite comprises:

a nonwoven layer having a first side and a second side comprising a nonwoven textile, wherein the nonwoven textile comprises a plurality of first fire-resistant fibers, wherein the first fire-resistant fibers are non-thermoplastic, and wherein the nonwoven layer forms the lower surface of the textile composite, wherein the nonwoven layer has a weight of about 100 and 200 g/m$^2$ and is between 40 and 80% by weight of the composite; and, a Lacoste knit layer comprising a knit textile with a Lacoste knit pattern and having a first side and a second side and machine and cross-machine directions, wherein the knit layer is oriented such that the first side of the knit faces the upper surface of the fire-resistant textile, wherein the knit layer is at least partially embedded in the nonwoven layer, wherein the knit textile comprises two feed yarns: a plurality of para-aramid first fire resistant yarns and plurality of pima cotton yarns, wherein the pima cotton yarns is biased towards one of the sides of the knit textile, wherein at least a portion of the first fire-resistant fibers from the nonwoven layer extend through the first side of the knit layer at least about 2 mm and form the upper surface of the textile composite, wherein the knit layer has a weight of less than about 75 g/m$^2$ and is between 20 and 60% by weight of the composite, wherein the knit layer has stretch in both the machine and cross-machine directions where stretch is defined as a fabric elongating under conditions of a human stretching it with their hands and stretch recovery where the fabric returns to approximately the original shape once the stretching force is removed (ASTM D6614).

2. The fire-resistant textile composite of claim 1, wherein the non-woven textile further comprises a plurality of second fire-resistant fibers.

3. The fire-resistant textile composite of claim 1, wherein the first fire-resistant fibers of the nonwoven textile comprise partially oxidized polyacrylonitrile.

4. A fire-resistant cushion covering comprising:

a cushion; and, a fire-resistant textile composite having an upper surface and a lower surface, wherein the fire-resistant composite has a weight of about 120 to 200 g/m$^2$, wherein the composite comprises:

a nonwoven layer having a first side and a second side comprising a nonwoven textile, wherein the nonwoven textile comprises a plurality of first fire-resistant fibers, wherein the first fire-resistant fibers are non-thermoplastic, and wherein the nonwoven layer forms the lower surface of the textile composite, wherein the nonwoven layer has a weight of about 100 and 200 g/m² and is between 40 and 80% by weight of the composite; and, a Lacoste knit layer comprising a knit textile with a Lacoste knit pattern and having a first side and a second side and machine and cross-machine directions, wherein the knit layer is oriented such that the first side of the knit faces the upper surface of the fire-resistant textile, wherein the knit layer is at least partially embedded in the nonwoven layer, wherein the knit textile comprises two feed yarns: a plurality of para-aramid yarns and a plurality of pima cotton yarns, wherein the pima cotton yarns is biased towards one of the sides of the knit textile, wherein at least a portion of the first fire-resistant fibers from the nonwoven layer extend through the first side of the knit layer at least about 2 mm and form the upper surface of the textile composite, wherein the knit layer has a weight of less than about 75 g/m² and is between 20 and 60% by weight of the composite, wherein the knit layer has stretch in both the machine and cross-machine directions where stretch is defined as a fabric elongating under conditions of a human stretching it with their hands and stretch recovery where the fabric returns to approximately the original shape once the stretching force is removed (ASTM D6614).

5. The fire-resistant textile composite of claim 4, wherein the non-woven textile further comprises a plurality of second fire-resistant fibers.

6. The fire-resistant textile composite of claim 4, wherein the first fire-resistant fibers of the nonwoven textile comprise partially oxidized polyacrylonitrile.

\* \* \* \* \*

UNITED STATES PATENT AND TRADEMARK OFFICE
CERTIFICATE OF CORRECTION

PATENT NO. : 11,691,379 B2
APPLICATION NO. : 16/897428
DATED : July 4, 2023
INVENTOR(S) : Warren W. Gerhardt et al.

It is certified that error appears in the above-identified patent and that said Letters Patent is hereby corrected as shown below:

In the Claims

In Column 8, Line 34, Claim 1 after the word "para-aramid" delete "first fire resistant"

Signed and Sealed this
Nineteenth Day of September, 2023

Katherine Kelly Vidal
*Director of the United States Patent and Trademark Office*